Feb. 16, 1943. H. Z. GORA 2,311,336
HYDRAULIC VALVE MECHANISM
Filed July 27, 1940 5 Sheets-Sheet 3

Inventor
Henry J. Gora.
By Cameron, Kerkam & Sutton
Attorneys

Feb. 16, 1943.   H. Z. GORA   2,311,336
HYDRAULIC VALVE MECHANISM
Filed July 27, 1940   5 Sheets-Sheet 4

Inventor
Henry J. Gora.
By Cameron, Kerkam & Sutton
Attorneys

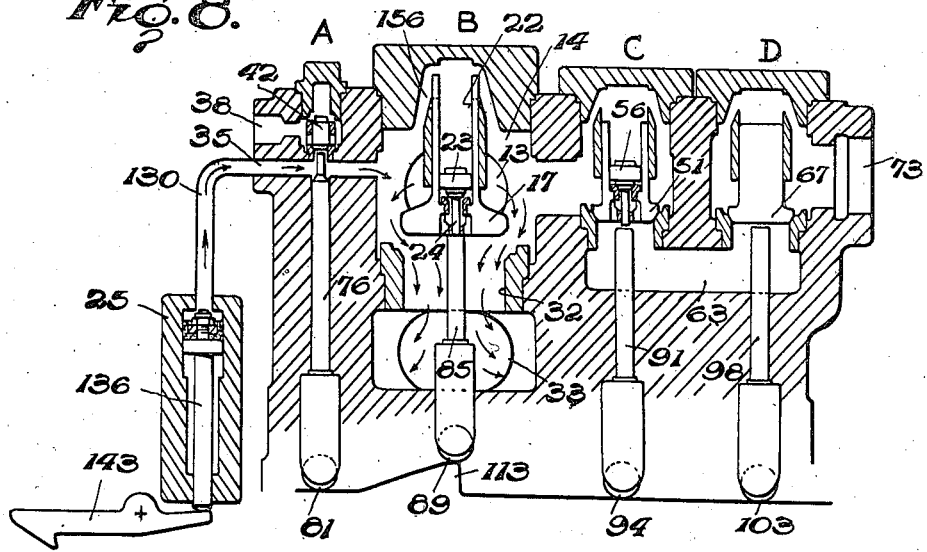

UNITED STATES PATENT OFFICE 2,311,336

HYDRAULIC VALVE MECHANISM

Henry Z. Gora, Bridgeport, Conn., assignor to Jenkins Bros., New York, N. Y., a corporation of New Jersey Application July 27, 1940, Serial No. 348,051

20 Claims. (Cl. 137—144)

This invention relates to valve mechanism, and more particularly to valve mechanism for controlling the flow of high and low pressure motive fluid, such as the motive fluid for hydraulic presses. The invention has particular utility when used in controlling the flow of the motive fluid to a hydraulic press used in the forming and curing of such articles as rubber valve stems for pneumatic tires, and will be exemplified by reference to a construction embodying the invention as applied to this service, but the invention is of wider utility as will be apparent to those skilled in the art.

In presses of the type just referred to it is desirable that the press be opened and closed by use of what will be referred to as low pressure fluid, whereas the actual molding of the stem should be effected under what will be referred to as high pressure fluid in order that the stem material may be forced into every part of the mold by a final exertion of high pressure and then retained under this pressure during the period when the stem material is being cured, as by vulcanization.

It is an object of this invention to provide an improved valve mechanism for controlling the flow of motive fluid to a press to effectuate the foregoing cycle of operation.

It has heretofore been proposed to provide a hydraulic press with sequentially operated valves for admitting first low pressure fluid and then high pressure fluid to the press with provisions for locking the actuator for the high pressure and exhaust valves against movement until the low pressure valve has been operated to establish the designed low pressure in the press, the proposed construction employing a lever for operating the low pressure valve pivoted on a rotatable cam for operating the high pressure and exhaust valves when lateral rotation is applied to the lever and thereby to the cam, said cam having a pressure operated means for locking the same against rotation until the lever operated valve has been opened to admit the low pressure to the press, following which said cam is released by said locking means and the lever may be rotated laterally out of operative relationship to the low pressure valve, to permit the same to close, whereupon the high pressure and exhaust valves are operable from the cam. A device of the type just referred to, however, is open to various objections among which may be noted the need for the operator to align the lever with the low pressure valve for operating the latter, the need for imparting different kinds and directions of movement to the same operating element in proper sequence and at proper intervals, the need for plural locks or stops when the operating member may move in a plurality of directions, the strain on and eventual looseness at the pivot of the lever arising from the use of the lever as an actuator for the rotary cam, the lack of assurance the valves will be operated in the desired sequence, etc.

It is an object of this invention to provide a device of the type characterized which is of improved and simplified construction and operation so that it involves only one kind of movement on the part of the operator, requires no close observation in order that the proper operating positions shall be reached and maintained, assures operation in a desired sequence, etc.

It has also been proposed to provide a plurality of hydraulic presses with pairs of inlet and outlet valves for controlling the respective presses, and to employ a rotary or rectilinearly movable actuator provided with cam projections for operating all of said valves to the end that the inlet and outlet valves of one press may be respectively in open and closed position while the inlet and outlet valves of a second press are respectively in closed and open positions so that the pressure fluid may be admitted to and exhausted from the two presses in alternation. A structure of this type, however, because of the very sequence of valve operation entailed thereby, renders such a construction inapplicable to the efficient control of sequentially applied low and high pressures to a single press cylinder.

It is an object of this invention to provide an improved valve mechanism of the type utilizing a rotatable disk provided with cam projections which is suitable for efficiently controlling in succession the admission to and release from a single cylinder of low and high pressure fluid.

It has also been proposed to provide a hydraulic press with a low pressure admission valve, a high pressure admission valve, and an exhaust valve which may be operated in sequence by a single cam actuator. Inasmuch as a construction of this character involves the exhausting of the high pressure to waste, there is a marked loss in efficiency.

It is an object of this invention to provide an improved valve mechanism whereby the high pressure fluid, when released, exhausts into the source of low pressure, so as to conserve the energy involved in placing the fluid under pressure.

Another object of this invention is to provide an improved valve mechanism of the type just characterized which is applicable to a press wherein a period of low pressure in the press follows the application of high pressure.

Another object of this invention is to provide an improved valve mechanism of the type hereinbefore referred to which employs a pilot valve in conjunction with one or both of the valves operated to release or reduce the pressure whereby the operating mechanism is relieved of the strain incident to opening a main exhaust or relief valve against the pressure then existing in the press.

Another object of this invention is to provide a device of the type last characterized wherein each pilot valve and its associated exhaust or relief valve are operated in proper sequence by a single operating means.

Another object of this invention is to provide an improved valve mechanism for controlling the flow of low and high pressure fluid and which includes improved means for predetermining when, after operation of the low pressure valve, the high pressure valve may be operated.

Another object of this invention is to provide an improved valve mechanism of the type hereinbefore characterized which is so constructed that the stations of the valve actuator are easily determined by the operator so as to simplify the operation, relieve the operator of close observation, assure a designed cycle of operation, and minimize the chances of improper operation through carelessness or lack of attention.

Another object of this invention is to provide an improved valve mechanism of the type hereinbefore characterized which is simple in construction, strong, durable and efficient.

Other objects will appear as the description of the invention proceeds.

The invention is capable of receiving a variety of mechanical expressions only one of which is illustrated on the accompanying drawings, and it is to be expressly understood that the drawings are for purposes of illustration only and are not to be construed as a definition of the limits of the invention, reference being had to the appended claims for that purpose.

Referring in detail to the accompanying drawings, wherein the same reference characters are employed to designate corresponding parts in the several figures, Fig. 1 is a vertical cross section, schematic in character, showing an embodiment of the present invention with the several valves and their operative means projected into a single plane for the sake of clearness of understanding, instead of being clustered around the axis of the rotatable valve actuator;

Figs. 4 to 8 inclusive are diagrammatic views to illustrate successive positions of the valve mechanism of this embodiment in the course of a complete cycle of operation.

Figure 1:
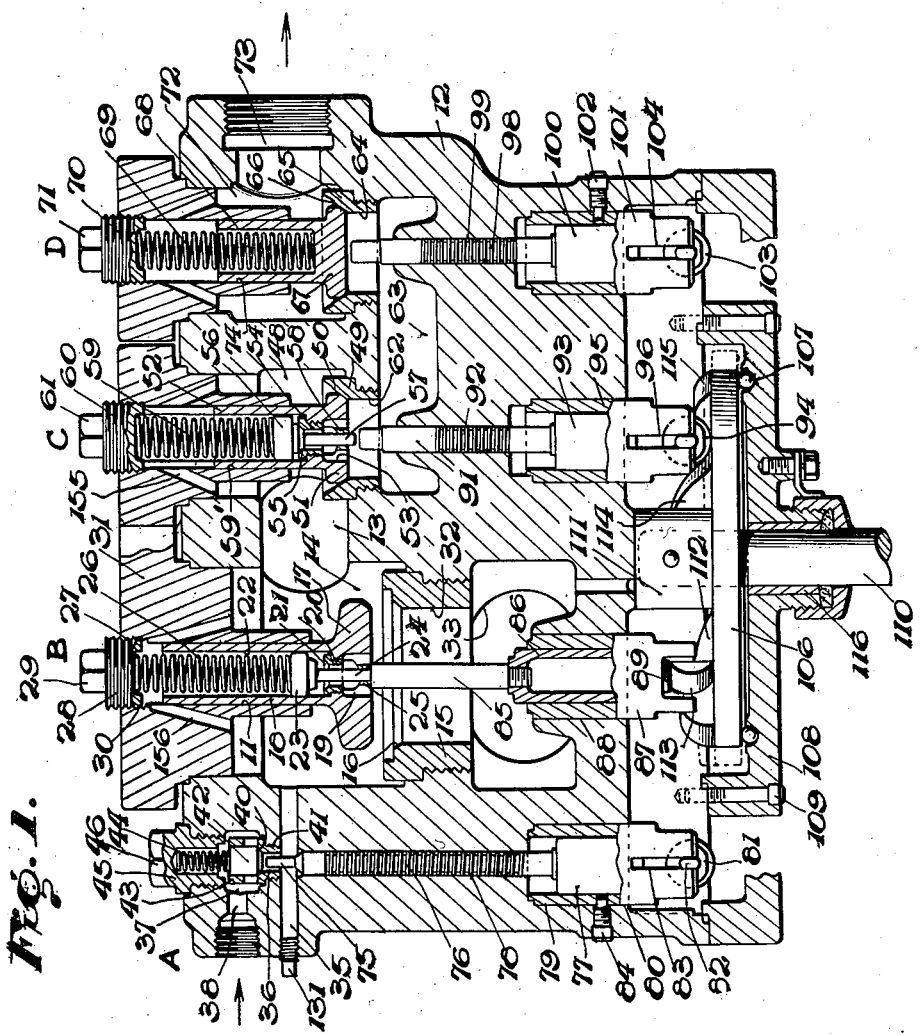

It is to be understood that the present invention may be used for controlling the flow of high and low pressure fluids to any suitable mechanism for utilizing the same, but for purposes of exemplification of the invention it will be assumed that the valve mechanism illustrated and to be described is associated with a hydraulic press of any suitable construction, such for example as appropriate for use in the molding and curing of rubber valve stems for pneumatic tires, wherein the cylinder of the press is to be supplied first with low pressure fluid to move the movable press head into its closed position, then with high pressure fluid in the same cylinder to effect the final "bump" necessary to force the movable press head home in order to assure that the molded material is forced under high pressure into every part of the mold, where in the case of rubber valve stems the high pressure will be held during the curing or vulcanization of the stem, after which the high pressure is released and there is a period of low pressure in the cylinder of the press during the withdrawal of the movable press head from its pressing position to its open position where, for example, a new set of molds may be introduced into the press.

With this understanding the cylinder of the press is connected through any suitable conduits or piping with the connection 10 (Fig. 2) of a valve housing 12, said connection 10 leading through opening 13 into chamber 14 suitably formed in the housing 12. Suitably formed in the wall of the chamber 14, as on a threaded sleeve 15, is a valve seat 16 designed to be engaged by a valve member 17. Valve member 17 is normally urged by a spring toward closed position, and in the preferred embodiment of the invention has associated therewith a pilot valve, preferably mounted to control a port through the main valve member 17. Any suitable construction to carry into effect the foregoing purposes may be employed. As shown, valve member 17 has a hollow sleeve-like extension 18 projecting from the rear face thereof and slidably mounted in a recess 11 formed in the housing 12 or the cover plate 31 thereof, and extending through the valve member proper is a passage 19, here shown as suitably formed to receive a threaded sleeve 20 providing a valve seat 21. Mounted in the hollow bore 22 of the sleeve 18 is a pilot valve member 23 movable freely in said bore and guided thereby, said bore 22 being in communication with the chamber 14 through a suitable passage or passages 156. From the forward face of said pilot valve member 23 projects a pin 24 which is guided in an apertured bridge 25 across the open end of the passage 19, said pin 24 being of such length that when the valve member 23 is engaged with the seat 21 said pin 24 projects beyond the face of the valve member 17 for a purpose hereinafter explained. Co-operating with the rear face of the pilot valve member 23 is a coil spring 26 which reacts between the same and a seat 27, here shown as formed in a threaded plug 28 provided with a projection 29 for engagement by a wrench, so that the tension of the spring may be adjusted by threading the plug 28 into or out of its opening 30 formed in the housing 12 or the separate cover plate 31 thereof. The port 32 from the valve seat 16 leads to an exhaust opening 33 communicating with any suitable connection 34 (Fig. 3) which may lead to waste or to return piping for the pumping or compressor system that develops hydraulic pressure.

Communicating with the chamber 14 is a passage 35 for the admission of high pressure fluid, said passage 35 communicating through a suitable port 36 with the chamber 37 of the high pressure admission valve, said chamber in turn connecting through passage 38 with any suitable connection 39 (Fig. 3) leading from the source of high pressure. Surrounding the port 36 is valve seat 40 provided in any suitable way in the wall of the chamber 37 and here shown as formed on a threaded sleeve 41. Co-operating with said seat 40 is high pressure admission valve member 42, here shown as guided in an apertured sleeve 43 which may be formed as an extension on the sleeve 41. Co-operating with valve member 42 is a coil spring 44 which reacts between said valve member and a seat in a plug 45 threaded into a suitable aperture in the housing 12 and having an exterior extension 46 where it may be engaged by a wrench for operating said plug to adjust the tension of the spring 44 by threading said plug into or out of its aperture in the housing.

Communicating with the opening 13 leading to the press is the chamber 48 of a valve for controlling the flow of high pressure fluid from the cylinder of the press to the source of low pressure fluid. Suitably formed in the wall of the chamber 48 and here shown as formed on a threaded sleeve 49 is a valve seat 50 with which co-operates a valve member 51. Valve member 51 also preferably has associated therewith a pilot valve, and as here shown the construction of valve member 51 with its associated pilot valve member is the same as that above described as employed with valve member 17 and its associated pilot valve. As illustrated valve member 51 has a hollow rearwardly extending sleeve-like extension 52 slidably mounted in a recess 59' whose interior communicates with a passage 53 through the valve member which in turn communicates through the hollow bore of extension 52 with one or more passages 155 leading to the chamber 48. Threadedly received in said passage 53 is a sleeve 54 provided with the valve seat 55, and co-operating with said seat 55 is a pilot valve member 56 having a pin 57 projecting from its forward face through bridge 58. Co-operating with the rear face of the valve member 56 is a coil spring 59 which seats in a threaded plug 60 having a projection 61 for engagement by a wrench so that the tension of said spring 59 may be adjusted as heretofore explained.

The port 62 leading from the valve member 51 communicates with a suitable chamber or passage 63 formed in the housing and which is in communication with the port 64 of a valve member for controlling the admission of low pressure fluid. As here shown port 64 is formed in a threaded sleeve 65 which provides a valve seat 66. Co-operating with said seat 66 is a valve member 67 having a rearwardly extending hollow sleeve-like extension 68 slidably mounted in a recess 74 and in which is seated a coil spring 69, that, at its opposite end, is engaged in the seat of a threaded plug 70 provided with an extension 71 for engagement by a wrench to effect the adjustment of the spring 69 in a manner heretofore made clear. The chamber 72 of said last named valve communicates through passage 73 with any suitable connection 74 (see Fig. 3) which may lead to a suitable accumulator or reservoir for the low pressure fluid.

It will be noted that the pressure of the fluid in chambers 14 and 48, which are in communication with the press cylinder through opening 13, tends to hold valve members 17 and 51 in closed position, as well as the pilot valves associated therewith, while the pressure in chamber 70 and passage 73 tends to hold valve member 67 on its seat.

Each of the foregoing valve means is operated by a cam actuated plunger. High pressure valve member 42 is designed to be engaged and opened by the end portion 75 of a rod 76 rectilinearly movable in an opening 78 and connected to a plunger 77, rod 76 being shown as grooved throughout the greater portion of its length so as to provide against leakage of high pressure liquid through opening 78 from the passage 35 through which the extremity 75 of rod 76 projects. Opening 78 communicates with a chamber 79 which receives a sleeve-like member 80 in which the plunger 77 is guided. Plunger 77 at its lower extremity is provided with a cam follower, here shown as in the form of a roller 81 the bearings 82 of which have flattened sides for guided movement in slots 83 provided in the lower extremity of the member 80. Member 80 may be retained against displacement in any suitable way as by a lock screw 84.

Valve member 17 is operated by a rod 85 connected to a plunger 86 which may slide in a sleeve-like member 87, comparable to member 80, suitably retained in the opening 88, plunger 86 at its lower extremity carrying a cam follower or roller 89 which may be of the same construction and similarly guided as heretofore described in connection with the plunger 77 and its associated parts. Rod 85 is adapted to engage the pin 24 on the pilot valve member 23 to lift the latter with respect to its seat, and then rod 85 will engage the under face of the valve member 17 or its bridge 25 and lift the valve member 17, as will appear more fully from the description of operation hereinafter contained.

Valve member 51 is operated by a rod 91 projecting through an opening 92 in the housing and connected to a plunger 93, rod 91 being grooved for a proportion of its length as shown to prevent leakage of the low pressure fluid through the opening 92 in which said rod 91 is slidably mounted. Plunger 93 is connected to a cam follower or roller 94 and is slidable in a sleeve-like member 95 suitably retained in the housing 12, said sleeve-like member being slotted at 96 to guide the roller 94 analogously as above described in connection with member 80 and its associated parts. Rod 91 is designed to engage the pin 57 on pilot valve member 56 to first operate said pilot valve member, after which said rod 91 will engage the under face of the valve member 51 or its bridge 58 and open the valve member 51 analogously as just described in conjunction with the valve member 17 and its associated pilot valve.

Valve member 67 is operated by rod 98 rectilinearly movable in the opening 99 suitably formed in the housing 12, rod 98 being grooved for a portion of its length to prevent leakage as heretofore explained. Rod 98 is connected to a plunger 100 slidable in a sleeve-like member 101 suitably retained in position as by a lock screw 102, plunger 100 having a cam follower or roller 103 which is guided in the slots 104 of said sleeve-like member 101, analogously as with sleeve 80 and its associated parts.

Figure 3:
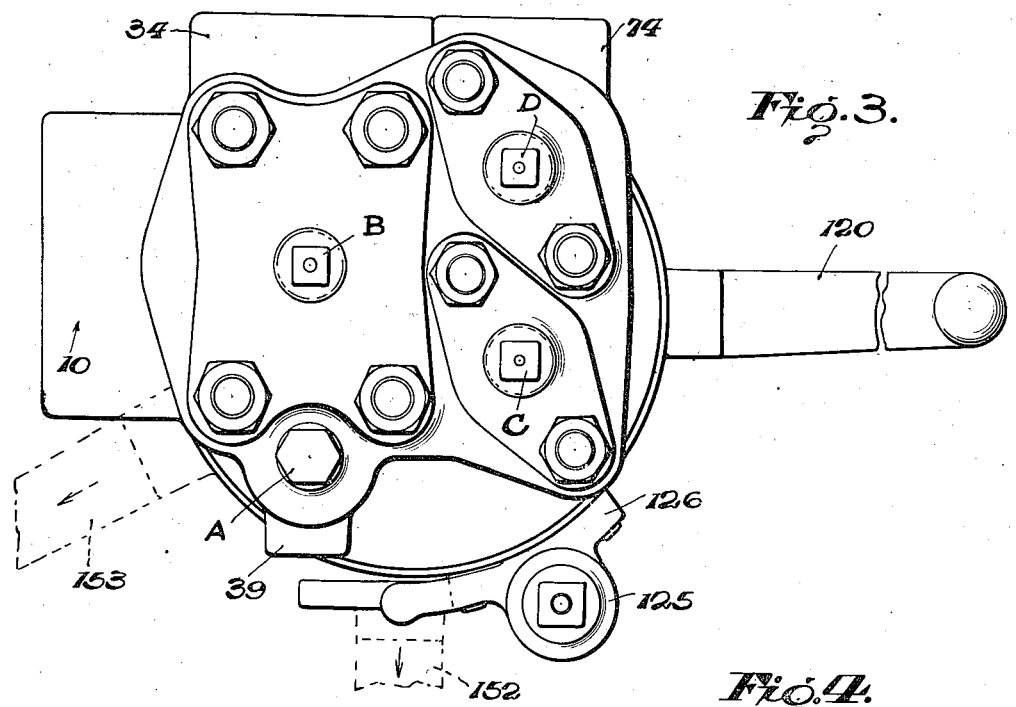
Fig. 3 is a plan view of said embodiment to illustrate the grouping of the several valves and the extreme positions of the valve actuator.

While for convenience of understanding the four valves so far described are illustrated in Fig. 1 as developed into a single plane, these valves in fact are closely clustered as shown in Fig. 3, the corresponding valves in the two figures being identified by corresponding reference characters A, B, C and D. Said valves are operated in proper sequence, as hereinafter explained, by a common valve actuator in the form of a disk 106 suitably mounted, as by ball bearings 107, in the lower part of the housing 12 or as shown on a plate 108 attached to the lower part of the housing 12 as by bolts or screws 109. Plate 106, which may be of generally circular form, is mounted on a shaft 110 and suitably guided in a bearing 111 in the housing 12. On its upper face plate 106 has suitable cam projections 112, 113, 114 and 115 at such distances from the axis of rotation of the plate 106 that they engage and elevate the cam followers 81, 89, 94 and 103 to which reference has heretofore been made. Suitably attached to the shaft 110 below the bearing 116, as by sleeve 118 pinned thereto at 119, is a handle member 120 provided with a suitable hand grasp 121 for rotating said plate 106 around its axis between two limit stops 122 and 123. The position of said member 120 at its two extreme positions is shown by full and dotted lines in Fig. 3.

Means are preferably provided to prevent the valve actuator from being moved to its position for operating the high pressure admission valve A until after low pressure has been admitted to the cylinder of the press and the movable press head has been closed. To this end an automatic stop is interposed in the path of movement of the handle member 120 to prevent the latter being moved into that position corresponding to the operation of the high pressure admission valve A until pressure backing up in a pressure operated device, after the movable press head has moved to its limit position, is operated to withdraw said stop.

Figure 2:
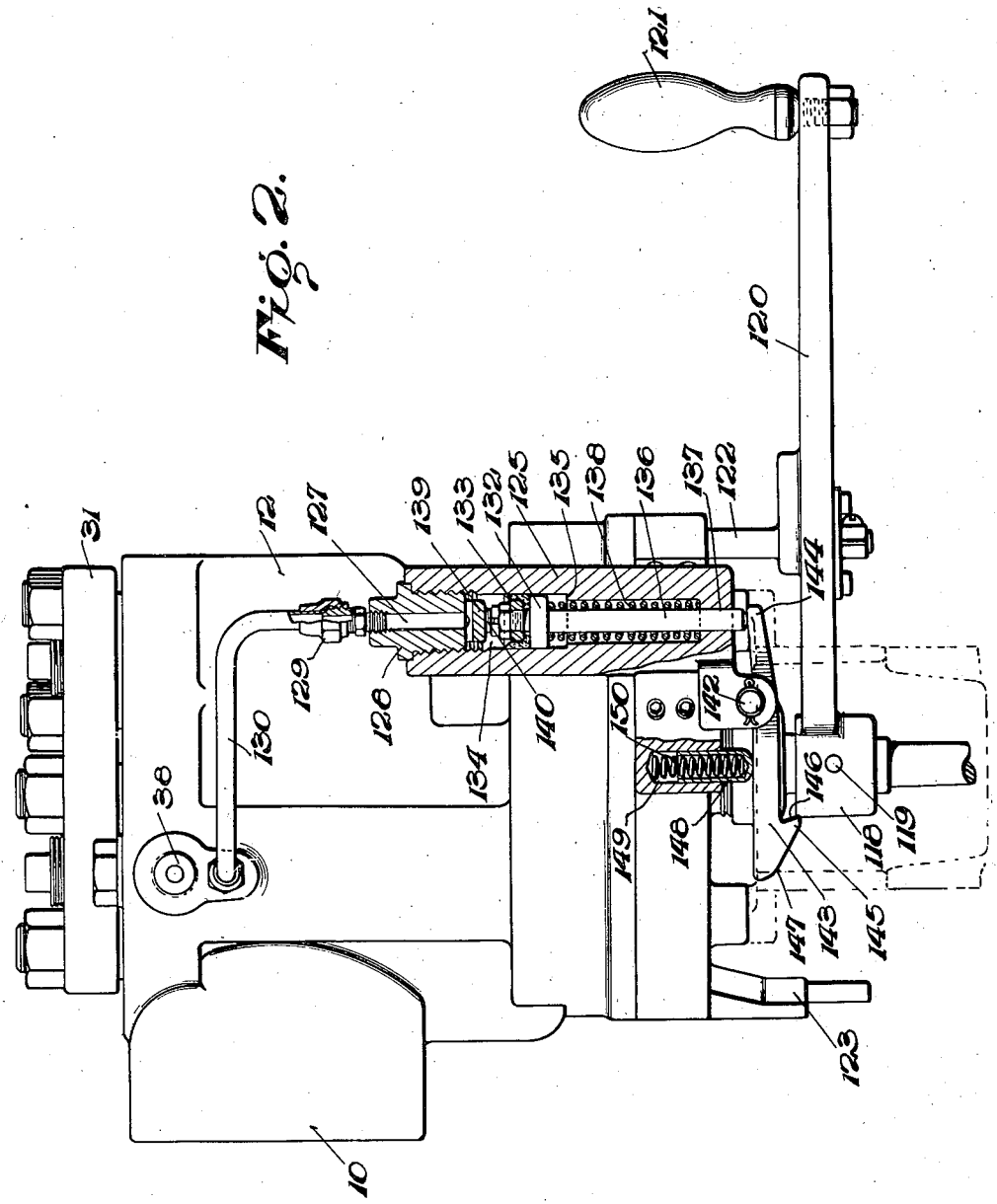
Fig. 2 is an elevation, partly in section, of the embodiment of Fig. 1 to illustrate the locking means and its operating means.

Referring more particularly to Fig. 2, a cylinder 125 is formed in or suitably attached to the wall of the housing 12 as by plate 126. Cylinder 125 communicates through a suitable passage 127 formed in the closure plug 128 at the end of said cylinder, and through a suitable coupling 129, with a conduit 130 that is connected in any suitable way, as by connection 131 (Fig. 1), to the passage 35. Mounted for reciprocation in the cylinder 125 is a piston 132, shown as provided with a suitable cup leather 133, designed to move downwardly within the upper enlarged portion 134 of said cylinder 125 until it is stopped by the shoulder 135. Projecting downwardly from the piston 132 is a rod 136 which extends through and is guided by an opening 137 in the end wall of the cylinder 125. Interposed between the end of the cylinder and said piston 132 is a coil spring 138 that normally urges the piston 132 to its uppermost position where it may be stopped by a projection 139 on the inner face of the plug 128. Piston 132 may be provided with an adjustable extension 140 to predetermine its position when said projection 140 engages the projection 139.

Pivotally mounted on the housing 12 or the plate 126 as at 142 is a locking lever 143 having its end 144 aligned with and engaged by the projecting end of the rod 136. The opposite or head end of said lever 143 has a downwardly projecting nose 145 that provides a locking surface 146 and an inclined surface 147 by which the lever may be cammed out of the way when the handle member 120 is moving in a counterclockwise direction. Thus lever 143 constitutes a stop for movement to the handle member 120 in only one direction. Lever 143 is normally retained with its end 144 in engagement with the rod 136 by a plunger 148 which is mounted to reciprocate in a recess 149 and which is urged by a coil spring 150 into contact with the lever 143.

When the press is fully opened the valves are in the relative positions shown in Fig. 8 and the handle member 120 is at its extreme right- hand position, as shown in the drawings, in engagement with the stop 122. Valves A, C and D are fully closed because the cam followers 81, 94 and 103 are in engagement with the flat portion of the surface of the cam actuator 106, but valve B is in wide open position because its valve member 17 is held in its upper position by the rod 85 since the cam follower 89 is at the highest point of the cam projection 113. Consequently, the opening 13 which is in communication with the press cylinder is in communication through the chamber 14 with the port 32 and the opening 33 leading to the exhaust. In this position of the valve 17 the pressure fluid in the press cylinder may drain out through the exhaust and the movable press head assume its inactive or open position. Cylinder 125 is also in communication with the chamber 14 through passage 35, and spring 138 is holding the rod 136 in its uppermost position as viewed in Fig. 2 so that the head of lever 143 is depressed by spring 150 and the locking surface 146 is in the path of movement of the handle member 120.

Figure 4:
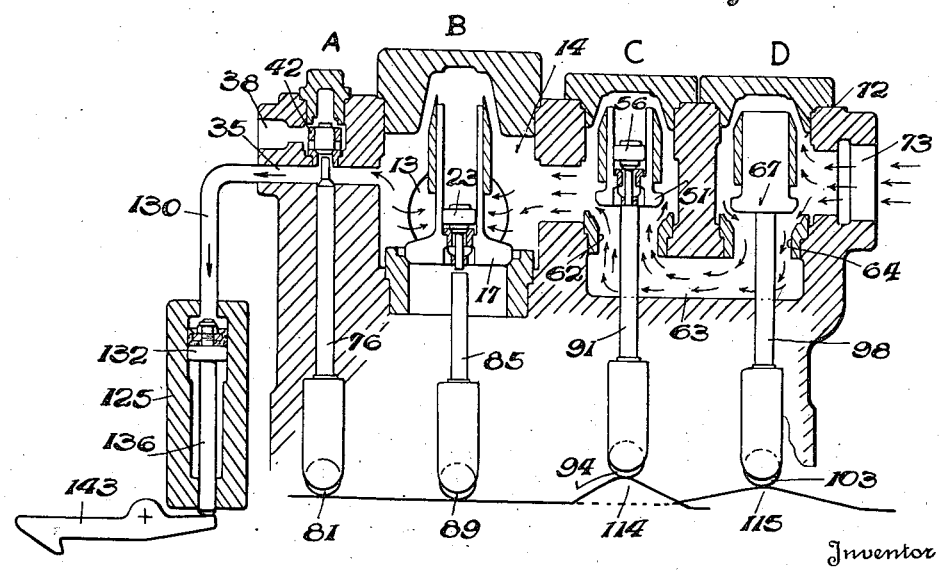

Assuming now that the press is to be operated, and following through a complete cycle of operation of the valve mechanism heretofore described, the handle member 120 is first moved from its extreme right-hand position as viewed in Fig. 3, and in a clockwise direction, to the position indicated by dotted lines 152 in Fig. 3, in which position said handle member 120 is engaged with and stopped by the locking face 146 of the lever 143. The positions of the parts are now as shown in Fig. 4. Valve A remains closed, and valve B is also closed because the cam follower 89 has moved to its lower position on the flat surface of the actuator 106 by the withdrawal of the cam projection 113 due to the rotation of the actuator 106. But this same rotation has brought cam projections 114 and 115 into engagement with the cam followers 94 and 103 respectively, elevating the rods 91 and 98, whereby said rods respectively engage the valve members 51 and 67 to fully open valves C and D. Low pressure fluid thus enters the chamber 72 through the passage 73, and flowing through the valve port 64 of the now open valve D, and through the passage 63, and through the valve port 62 of the now open valve C, said low pressure fluid enters the chamber 14 and flows to the press through the opening 13. This low pressure fluid, entering the cylinder of the press, will move the movable press head to its closed position.

Figure 5:
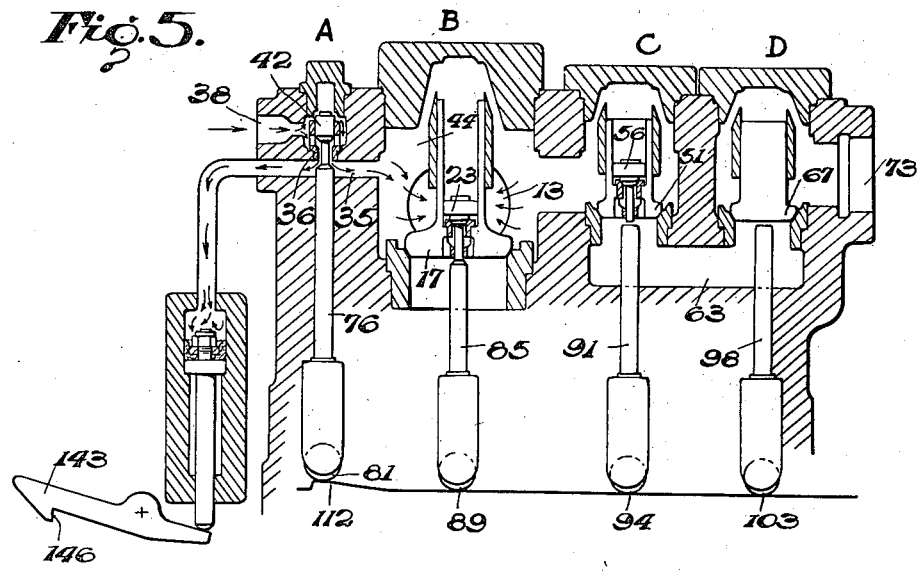

When the movable press head has thus been moved to its limit position the pressure fluid may back up through the passages 35 and 130 into the cylinder 125, moving the piston 132 from the position shown in Fig. 4 to the position shown in Fig. 5, against the tension of the spring 138, to elevate the head of lever 143 and withdraw its locking face 146 from the path of movement of handle member 120. Handle member 120 may therefore be moved from its dotted position 152 to its dotted position 153 at the extreme left-hand position of its movement as viewed in the drawings where said handle member engages the stop 123. This movement of the handle member effects a corresponding rotation of the actuator 106 whereby the cam elevations 114 and 115 are withdrawn from the cam followers 94 and 103 respectively to effect the closure of the valves C and D. Valve B also remains closed, but the cam elevation 112 engages cam follower 81 and through rod 76 the high pressure valve member 42 is engaged and elevated to open valve A. The parts are now in the relative positions shown in Fig. 5, and high pressure fluid enters through passage 38 and, flowing through port 36, enters the chamber 14 through passage 35, and thence flows through opening 13 to the cylinder of the press, whereby the press head is given its final "bump" and the parts of the mold moved to their final positions, assuring that the molded material occupies all portions of the mold cavities under high pressure. In the molding of rubber valve stems, as hereinbefore referred to, this position will be maintained while the rubber is cured or vulcanized.

Figure 6:
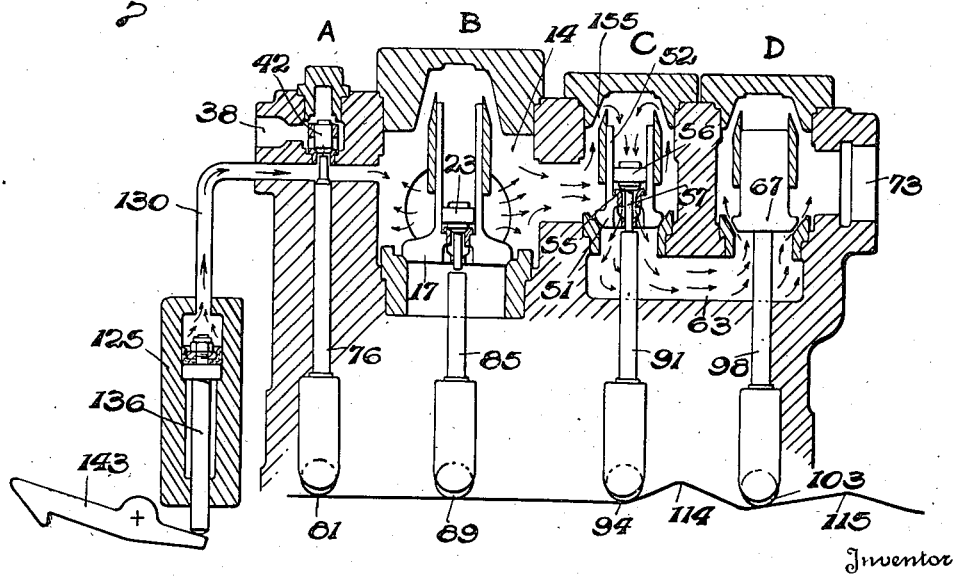

To effect the opening of the press, handle member 120 is moved in an anticlockwise position from its position 153 in Fig. 3. Rotation of the actuator 106 withdraws cam projection 112 from under cam follower 81 whereby high pressure admission valve A is closed. Valve B also remains closed. But cam projections 114 and 115 respectively begin to operate cam followers 94 and 103. The first action of cam follower 94 is to elevate rod 91 and engage the pin 57 of pilot valve member 56, elevating the latter to open said pilot valve. The high pressure in chamber 14 is thus relieved, the fluid flowing through the passage or passages 155 into the hollow interior of the rearwardly projecting extension 52 on the valve member 51 and thence through the pilot valve port into the passage 63. Simultaneously cam follower 103 has engaged the incline on the cam projection 115 whereby rod 98 is elevated to crack the valve member 67, all as shown in Fig. 6. Hence the high pressure fluid may flow from the passage 63 through passage 73 to the reservoir for low pressure fluid. Thus the pressure which has been generated in the high pressure fluid is partly conserved at the level of the pressure existing in the low pressure reservoir.

Further rotation of the actuator 106 in an anticlockwise direction causes cam projection 114 to fully elevate the cam follower 94 whereby the rod 91 picks up the valve member 51 and fully opens valve C, cam projection 115 simultaneously elevating cam follower 103 whereby through rod 98 the valve member 67 is fully elevated, and thereby valve D is fully opened. The parts are now in the relative positions shown in Fig. 7 and the high pressure may exhaust fully from the cylinder of the press into the reservoir for low pressure fluid.

Further rotation of the actuator 106 in an anticlockwise direction withdraws the cam projections 114 and 115 from the cam followers 94 and 103, whereby valves C and D are closed to retain the pressure in the low pressure reservoir, after which cam projection 113 elevates cam follower 89 and rod 85 to first engage pin 24 and open pilot valve member 23, whereby the low pressure back of the valve member 17 is released, the fluid flowing through the passage or passages 156 from the chamber 14 through the hollow bore 22 of the sleeve-like extension on the valve member 17 and thence through the port 32 to the exhaust opening 33. Continued elevation of the cam follower 89 by the cam projection 113, as the handle member 120 approaches its extreme position in anticlockwise direction to engage the stop 122, causes rod 85 to eventually pick up valve member 17 and move it to its wide open position as shown in Fig. 8, whereby the fluid in the cylinder of the press may exhaust freely through the opening 13, port 32 and opening 33, permitting the movable press head to move to its wide open position.

As long as pressure remains in the cylinder of the press, the locking lever 143 is held in its elevated position, but as the pressure is relieved in the cylinder of the press the fluid in the cylinder 125 may exhaust through the passages 130 and 35 to chamber 14, permitting spring 138 to elevate rod 136 and thereby permit spring 150 to return the lever 143 to its original position. If this occurs before the handle member 120 has passed the stem, handle member 120 may cam the head of lever 143 out of the way by reason of the inclined surface 147. Thus the parts are restored to their original position shown in Fig. 8 wherein the press is ready for a new cycle of operations.

It will therefore be perceived that by the present invention a valve mechanism has been provided whereby a single rotary member moving between stops will in proper sequence admit low pressure fluid to the cylinder of the press, and then when this low pressure has been established in the press as a result of the movement of the movable press head to limit position, said actuator may be moved to admit the high pressure fluid, after which the high pressure fluid may be released, a large part of the energy therein being conserved by causing the same to flow to the low pressure source, and thereafter the pressure in the cylinder is fully released to permit the movable press head to move to open position.

Furthermore, locking means have been provided whereby the actuator may not move to the position admitting high pressure fluid to the cylinder until the press head has moved to its limit position, and this is effected by the interposition of an automatically operated stop that predetermines the position of the actuator during that period when the press head is moving from open to closed position, but which constitutes a stop for movement of the actuator in only one direction.

The valve actuator of the present invention need not be closely observed, but all operations thereof are by a simple movement in a single direction, from one limit position to another, as determined by stops which are so related to the cam projections on the actuator that a mere movement to each of the limit positions as determined by the stops assures the proper movements and desired sequence of operation of the valve members to obtain the proper effects. Furthermore, both of the valve members that are opened to relieve pressure acting on the rear faces thereof and thereby tending to hold the same in closed position have associated with them pilot operated valves for initiating the release of pressure whereby the difference in pressure at the two faces thereof is first reduced to facilitate the opening of the main valve members with a consequent reduction in strain and wear on the valve operating members. These pilot valves also possess an additional advantage in that they minimize flow shock, as in closing each main valve engages its seat before the associated pilot valve starts to close, thereby decreasing the flow but not discontinuing the flow until the pilot valve member engages its seat. The pilot valve associated with valve C has a further advantage in reducing flow shock in that the opening of this pilot valve ahead of the main valve initiates a flow from the chamber 14, which is then under high pressure, into the passage 53 leading to the low pressure source, before the full pressure in chamber 14 is applied through the port 50 to the passages leading to the low pressure source—thus eliminating the shock in the passages leading to the low pressure source which would otherwise be caused if the full pressure in chamber 14 were applied at once to initiate the flow of this column of fluid.

The present invention assures economic operation by conserving the energy latent in the high pressure fluid by causing it to exhaust to the low pressure source, and thus the present valve mechanism assures economical operation. The structure of the valve mechanism avoids undue complexities in providing for the sequential operation of admission and exhaust valves for both low and high pressure fluid flowing to a single cylinder, while the character of operations involved are such that close observation or care on the part of the operator is unnecessary, whereby the chances of irregularities of operation are minimized because of the simple and direct character of the movements involved. The structure is not only simple in its formation and operation, but it is strong and durable in character, and thus particularly adapted to employment in the control of hydraulic presses by ordinary workmen.

While the invention has been particularly exemplified by reference to its use in hydraulic presses, and illustrated as used in controlling a press employed in the molding of rubber valve stems for pneumatic tires, the invention is of wider utility, as will now be apparent to those skilled in the art. While the embodiment of the invention illustrated on the drawings has been described in considerable detail, it is to be expressly understood that the invention is not restricted thereto, as the same is capable of receiving a variety of mechanical expressions, some of which will readily suggest themselves to those skilled in the art, while other forms of valves and means for opening and closing the valves, other arrangements of the valves, other forms of locking means, etc., may be employed within the broader aspects of the invention, one or both of the other valves may be provided with a pilot valve, and changes may also be made in details of construction, arrangement and proportion of parts, and certain features used without other features, without departing from the spirit of this invention. Reference is therefore to be had to the claims appended hereto for a definition of the invention.

What is claimed is:

1. In a valve mechanism for controlling high and low pressure fluid in succession, a body having a high pressure valve means with an inlet adapted to be connected to a source of high pressure fluid and an outlet communicating with a chamber in said body, said chamber being adapted to communicate with a means to or from which said fluid may flow, a low pressure exhaust valve means having its inlet in communication with said chamber and its outlet adapted to communicate with exhaust means, a common valve means having one of its passages communicating with said chamber and another passage adapted to communicate with a source of low pressure fluid whereby said common valve means may supply low pressure fluid to said chamber or exhaust high pressure fluid from said chamber to said low pressure supply means, a common actuator for all of said valve means including a single rotatable member provided with cam projections, one corresponding to each valve means, and means in the path of movement of each cam projection for operating its corresponding valve means, the cam projections of the actuator being so arranged that only one of either the high pressure, the exhaust or the common valve means may be opened at any time.

2. In a valve mechanism for controlling high and low pressure fluid in succession, a body having a high pressure valve means with an inlet adapted to be connected to a source of high pressure fluid and an outlet communicating with a chamber in said body, said chamber being adapted to communicate with a means to or from which said fluid may flow, a low pressure exhaust valve means having its inlet in communication with said chamber and its outlet adapted to communicate with exhaust means, a common valve means having one of its passages communicating with said chamber and another passage adapted to communicate with a source of low pressure fluid whereby said common valve means may supply low pressure fluid to said chamber or exhaust high pressure fluid from said chamber to said low pressure supply means, a common actuator for all of said valve means including a single rotatable member provided with cam projections, one corresponding to each valve means, means in the path of movement of each cam projection for operating its corresponding valve means, the cam projections of the actuator being so arranged that only one of either the high pressure, the exhaust or the common valve means may be opened at any time, and pressure operated means for preventing movement of said actuator to a position for opening said high pressure valve means until a predetermined pressure has been established through operation of said common valve means for admitting low pressure fluid to said chamber.

3. In a valve mechanism for controlling high and low pressure fluid in succession, a body having a high pressure valve means with an inlet adapted to be connected to a source of high pressure fluid and an outlet communicating with a chamber in said body, said chamber being adapted to communicate with a means to or from which said fluid may flow, a low pressure exhaust valve means having its inlet in communication with said chamber and its outlet adapted to communicate with exhaust means, a common valve means having one of its passages communicating with said chamber and another passage adapted to communicate with a source of low pressure fluid whereby said common valve means may supply low pressure fluid to said chamber or exhaust high pressure fluid from said chamber to said low pressure supply means, a common actuator for all of said valve means including a single rotatable member provided with cam projections, one corresponding to each valve means, and means in the path of movement of each cam projection for operating its corresponding valve means, the cam projections of the actuator being so arranged that only one of either the high pressure, the exhaust or the common valve means may be opened at any time, at least one of said valve means for controlling exhaust including a pilot valve and means whereby said pilot valve is opened ahead of the exhaust valve means with which it is associated.

4. In a valve mechanism for controlling high and low pressure fluid in succession, a body having a high pressure valve with an inlet adapted to be connected to a source of high pressure fluid and an outlet communicating with a chamber in said body, said chamber being adapted to communicate with a means to or from which said fluid may flow, a low pressure exhaust valve having its inlet in communication with said chamber and its outlet adapted to communicate with exhaust means, a high pressure exhaust valve and a low pressure admission valve controlling a common passage which communicates at one end with said chamber and at its other end with a source of low pressure fluid whereby said last named valves may supply low pressure to said chamber or exhaust high pressure fluid from said chamber to said low pressure supply means, a common actuator for said four valves including a single rotatable disk provided on its face with four cam projections, and means in the path of each of said projections and associated with one of said valves for operating the same, said cam projection for said high pressure valve, said cam projection for said low pressure exhaust valve and the cam projections for the high pressure exhaust valve and low pressure admission valve being so arranged that only the high pressure valve or the low pressure exhaust valve or the high pressure exhaust valve and low pressure admission valve may be open at any time.

5. In a valve mechanism for controlling high and low pressure fluid in succession, a body having a high pressure valve with an inlet adapted to be connected to a source of high pressure fluid and an outlet communicating with a chamber in said body, said chamber being adapted to communicate with a means to or from which said fluid may flow, a low pressure exhaust valve having its inlet in communication with said chamber and its outlet adapted to communicate with exhaust means, a high pressure exhaust valve and a low pressure admission valve controlling a common passage which communicates at one end with said chamber and at its other end with a source of low pressure fluid whereby said last named valves may supply low pressure to said chamber or exhaust high pressure fluid from said chamber to said low pressure supply means, a common actuator for said four valves including a single rotatable disk provided on its face with four cam projections, means in the path of each of said projections and associated with one of said valves for operating the same, said cam projection for said high pressure valve, said cam projection for said low pressure exhaust valve and the cam projections for the high pressure exhaust valve and low pressure admission valve being so arranged that only the high pressure valve or the low pressure exhaust valve or the high pressure exhaust valve and low pressure admisison valve may be open at any time, and pressure operated means for preventing movement of said actuator to a position for opening said high pressure valve until a predetermined pressure has been established through operation of said valves controlling said common passage.

6. In a valve mechanism for controlling high and low pressure fluid in succession, a body having a high pressure valve with an inlet adapted to be connected to a source of high pressure fluid and an outlet communicating with a chamber in said body, said chamber being adapted to communicate with a means to or from which said fluid may flow, a low pressure exhaust valve having its inlet in communication with said chamber and its outlet adapted to communicate with exhaust means, a high pressure exhaust valve and a low pressure admission valve controlling a common passage which communicates at one end with said chamber and at its other end with a source of low pressure fluid whereby said last named valves may supply low pressure to said chamber or exhaust high pressure fluid from said chamber to said low pressure supply means, a common actuator for said four valves including a single rotatable disk provided on its face with four cam projections, and means in the path of each of said projections and associated with one of said valves for operating the same, said cam projection for said high pressure valve, said cam projection for said low pressure exhaust valve and the cam projections for the high pressure exhaust valve and low pressure admission valve being so arranged that only the high pressure valve or the low pressure exhaust valve or the high pressure exhaust valve and low pressure admission valve may be open at any time, at least one of said valves for controlling exhaust including a pilot valve and means whereby said pilot valve is opened ahead of the exhaust valve with which it is associated.

7. In a valve mechanism for controlling high and low pressure fluid in succession, a body having a high pressure valve with an inlet adapted to be connected to a source of high pressure fluid and an outlet communicating with a chamber in said body, said chamber being adapted to communicate with a means to or from which said fluid may flow, a low pressure exhaust valve having its inlet in communication with said chamber and its outlet adapted to communicate with exhaust means, a high pressure exhaust valve and a low pressure admission valve forming a valve means controlling a common passage which communicates at one end with said chamber and at its other end with a source of low pressure fluid whereby said last named valve means may supply low pressure to said chamber or exhaust high pressure fluid from said chamber to said low pressure supply means, and a common actuator constructed and arranged to operate said valve means, said high pressure valve and said low pressure exhaust valve in proper sequence.

8. In a valve mechanism for controlling high and low pressure fluid in succession, a body having a high pressure valve with an inlet adapted to be connected to a source of high pressure fluid and an outlet communicating with a chamber in said body, said chamber being adapted to communicate with a means to or from which said fluid may flow, a low pressure exhaust valve having its inlet in communication with said chamber and its outlet adapted to communicate with exhaust means, a high pressure exhaust valve and a low pressure admission valve forming a valve means controlling a common passage which communicates at one end with said chamber and at its other end with a source of low pressure fluid whereby said last named valve means may supply low pressure to said chamber or exhaust high pressure fluid from said chamber to said low pressure supply means, and a common actuator constructed and arranged to operate said valve means, said high pressure valve and said low pressure exhaust valve in proper sequence, said common actuator including a rotatable disk, a member for rotating said disk and means in the path of said member for stopping the rotation of said disk in the positions of said common actuator corresponding respectively to the full opening of the high pressure valve, full opening of the low pressure admission valve and full opening of the low pressure exhaust valve.

9. In a valve mechanism for controlling high and low pressure fluid in succession, a body having a high pressure valve with an inlet adapted to be connected to a source of high pressure fluid and an outlet communicating with a chamber in said body, said chamber being adapted to communicate with a means to or from which said fluid may flow, a low pressure exhaust valve having its inlet in communication with said chamber and its outlet adapted to communicate with exhaust means, a high pressure exhaust valve and a low pressure admission valve forming a valve means controlling a common passage which communicates at one end with said chamber and at its other end with a source of low pressure fluid whereby said last named valve means may supply low pressure to said chamber or exhaust high pressure fluid from said chamber to said low pressure supply means, a common actuator constructed and arranged to operate said valve means, said high pressure valve and said low pressure exhaust valve in proper sequence, said common actuator including a rotatable disk provided on its face with cam projections, one corresponding to each valve, and a plunger aligned with each valve and adapted to be actuated by the corresponding cam projection to move said plunger and lift the corresponding valve from its seat.

10. In a valve mechanism for controlling high and low pressure fluid in succession, a body having a high pressure valve with an inlet adapted to be connected to a source of high pressure fluid and an outlet communicating with a chamber in said body, said chamber being adapted to communicate with a means to or from which said fluid may flow, a low pressure exhaust valve having its inlet in communication with said chamber and its outlet adapted to communicate with exhaust means, a high pressure exhaust valve and a low pressure admission valve forming a valve means controlling a common passage which communicates at one end with said chamber and at its other end with a source of low pressure fluid whereby said last named valve means may supply low pressure to said chamber or exhaust high pressure fluid from said chamber to said low pressure supply means, and a common actuator constructed and arranged to operate said valve means, said high pressure valve and said low pressure exhaust valve in proper sequence, at least one of said exhaust valves being provided with a pilot valve for releasing the pressure thereon preliminarily to the opening of said exhaust valve.

11. In a valve mechanism for controlling high and low pressure fluid in succession, a body having a high pressure valve with an inlet adapted to be connected to a source of high pressure fluid and an outlet communicating with a chamber in said body, said chamber being adapted to communicate with a means to or from which said fluid may flow, a low pressure exhaust valve having its inlet in communication with said chamber and its outlet adapted to communicate with exhaust means, a high pressure exhaust valve and a low pressure admission valve forming a valve means controlling a common passage which communicates at one end with said chamber and at its other end with a source of low pressure fluid whereby said last named valve means may supply low pressure to said chamber or exhaust high pressure fluid from said chamber to said low pressure supply means, and a common actuator constructed and arranged to operate said valve means, said high pressure valve and said low pressure exhaust valve in proper sequence, at least one of said exhaust valves being provided with a port therethrough and a pilot valve member cooperating with said port and having an extension beyond said exhaust valve, said extension adapted to be operated by said actuator to open said pilot valve before said exhaust valve is opened.

12. In a valve mechanism for controlling high and low pressure fluid in succession, a body having a high pressure valve with an inlet adapted to be connected to a source of high pressure fluid and an outlet communicating with a chamber in said body, said chamber being adapted to communicate with a means to or from which said fluid may flow, a low pressure exhaust valve having its inlet in communication with said chamber and its outlet adapted to communicate with exhaust means, a high pressure exhaust valve and a low pressure admission valve forming a valve means controlling a common passage which communicates at one end with said chamber and at its other end with a source of low pressure fluid whereby said last named valve means may supply low pressure to said chamber or exhaust high pressure fluid from said chamber to said low pressure supply means, a common actuator constructed and arranged to operate said valve means, said high pressure valve and said low pressure exhaust valve in proper sequence, said common actuator including a rotatable disk provided with four cam projections and plungers aligned with the respective valves and adapted to cooperate with said cam projections to open said valves, and means to stop said disk after said high pressure exhaust valve and said low pressure admission valve have been opened and to prevent further rotation thereof toward that position wherein the high pressure valve is opened until a predetermined pressure exists in said outlet.

13. In a valve mechanism for controlling high and low pressure fluid in succession, a body having a high pressure valve with an inlet adapted to be connected to a source of high pressure fluid and an outlet communicating with a chamber in said body, said chamber being adapted to communicate with a means to or from which said fluid may flow, a low pressure exhaust valve having its inlet in communication with said chamber and its outlet adapted to communicate with exhaust means, a high pressure exhaust valve and a low pressure admission valve forming a valve means controlling a common passage which communicates at one end with said chamber and at its other end with a source of low pressure fluid whereby said last named valve means may supply low pressure to said chamber or exhaust high pressure fluid from said chamber to said low pressure supply means, a common actuator constructed and arranged to operate said valve means, said high pressure valve and said low pressure exhaust valve in proper sequence, said common actuator including a rotatable disk provided with four cam projections and plungers aligned with the respective valves and adapted to cooperate with said cam projections to open said valves, and means to stop said disk after said high pressure exhaust valve and said low pressure admission valve have been opened and to prevent further rotation thereof toward that position wherein the high pressure valve is opened until a predetermined pressure exists in said outlet, said last named means including a pivotally mounted lever provided with a stop face and pressure operated means communicating with said chamber and cooperating with said lever to withdraw said stop face when a predetermined pressure exists in said chamber.

14. In a valve mechanism for controlling high and low pressure fluid in succession, a body having a high pressure valve with an inlet adapted to be connected to a source of high pressure fluid and an outlet communicating with a chamber in said body, said chamber being adapted to communicate with a means to or from which said fluid may flow, a low pressure exhaust valve having its inlet in communication with said chamber and its outlet adapted to communicate with exhaust means, a high pressure exhaust valve and a low pressure admission valve forming a valve means controlling a common passage which communicates at one end with said chamber and at its other end with a source of low pressure fluid whereby said last named valve means may supply low pressure to said chamber or exhaust high pressure fluid from said chamber to said low pressure supply means, and a common actuator constructed and arranged to operate said valve means, said high pressure valve and said low pressure exhaust valve in proper sequence, said common actuator including a rotatable disk provided with four cam projections and plungers associated with the respective cam projections and aligned with the respective valve members to open the same, each of said exhaust valves including a pilot valve which is also opened by the plunger associated with the corresponding exhaust valve before the said exhaust valve is opened.

15. In a valve mechanism for controlling high and low pressure fluid in succession, a body having a high pressure valve with an inlet adapted to be connected to a source of high pressure fluid and an outlet communicating with a chamber in said body, said chamber being adapted to communicate with a means to or from which said fluid may flow, a low pressure exhaust valve having its inlet in communication with said chamber and its outlet adapted to communicate with exhaust means, a high pressure exhaust valve and a low pressure admission valve forming a valve means controlling a common passage which communicates at one end with said chamber and at its other end with a source of low pressure fluid whereby said last named valve means may supply low pressure to said chamber or exhaust high pressure fluid from said chamber to said low pressure supply means, and a common actuator constructed and arranged to operate said valve means, said high pressure valve and said low pressure exhaust valve in proper sequence, said common actuator including a rotatable disk provided with four cam projections, plungers associated with the respective cam projections and aligned with the respective valve members to open the same, each of said exhaust valves being provided with a port therethrough and a pilot valve member cooperating with said port and having a pin projecting beyond the associated exhaust valve member into the path of movement of the associated plunger whereby said plunger opens said pilot valve through engagement with said pin before engaging the exhaust valve member to open the same.

16. In a valve mechanism for controlling the flow of high and low pressure fluid in succession, a body having a high pressure valve with an inlet adapted to be connected to a source of high pressure fluid and an outlet communicating with a chamber in said body, operating means for said high pressure valve, said chamber being adapted to communicate with a means to or from which said fluid may flow, a low pressure exhaust valve having its inlet in communication with said chamber and its outlet adapted to communicate with exhaust means, operating means for said low pressure exhaust valve, and means for exhausting high pressure fluid from said chamber to a low pressure supply means and for admitting low pressure fluid from said low pressure supply means to said chamber including a single passage communicating with said chamber and said low pressure supply means, a pair of main valve members cooperating with valve seats in said passage, a pilot valve associated with one of said main valve members, and common means for opening both of said main valve members when low pressure fluid is to be admitted to said chamber and for first opening said pilot valve and cracking the other main valve member and thereafter opening both of said main valve members wide when high pressure fluid is to be exhausted from said chamber.

17. In a valve mechanism for controlling the flow of high and low pressure fluid in succession, a body having a high pressure valve with an inlet adapted to be connected to a source of high pressure fluid and an outlet communicating with a chamber in said body, operating means for said high pressure valve, said chamber being adapted to communicate with a means to or from which said fluid may flow, a low pressure exhaust valve having its inlet in communication with said chamber and its outlet adapted to communicate with exhaust means, operating means for said low pressure exhaust valve, and means for exhausting high pressure fluid from said chamber to a low pressure supply means and for admitting low pressure fluid from said low pressure supply means to said chamber including a single passage communicating with said chamber and said low pressure supply means, a pair of main valve members cooperating with valve seats in said passage, a pilot valve associated with one of said main valve members, and common means for opening both of said main valve members when low pressure fluid is to be admitted to said chamber and for first opening said pilot valve and cracking the other main valve member and thereafter opening both of said main valve members wide when high pressure fluid is to be exhausted from said chamber, said last named means including a single rotatable disk having cam projections and means cooperating therewith for operating said valve members.

18. In a valve mechanism for controlling the flow of high and low pressure fluid in succession, a body having a high pressure valve with an inlet adapted to be connected to a source of high pressure fluid and an outlet communicating with a chamber in said body, said chamber being adapted to communicate with a means to or from which said fluid may flow, a low pressure exhaust valve having its inlet in communication with said chamber and its outlet adapted to communicate with exhaust means, and means for exhausting high pressure fluid from said chamber to a low pressure supply means and for admitting low pressure fluid from said low pressure supply means to said chamber including a single passage communicating with said chamber and said low pressure supply means, a pair of main valve members cooperating with valve seats in said passage, a pilot valve associated with one of said main valve members, and common means for opening both of said main valve members when low pressure fluid is to be admitted to said chamber and for first opening said pilot valve and cracking the other main valve member and thereafter opening both of said main valve members wide when high pressure fluid is to be exhausted from said chamber, said last named means including a single actuator provided with cam projections and plungers associated with said cam projections and said valve members for operating the latter from said cam projections, said actuator also including other cam projections and plungers associated therewith and with said high pressure valve and said low pressure exhaust valve for operating the latter only when the first named valve members are closed, said last named cams being so arranged that only said high pressure valve or said low pressure exhaust valve is open at any one time depending upon the direction of movement of said actuator.

19. In a valve mechanism for controlling the flow of high and low pressure fluid in succession, a body having a high pressure valve with an inlet adapted to be connected to a source of high pressure fluid and an outlet communicating with a chamber in said body, said chamber being adapted to communicate with a means to or from which said fluid may flow, a low pressure exhaust valve having its inlet in communication with said chamber and its outlet adapted to communicate with exhaust means, and means for exhausting high pressure fluid from said chamber to a low pressure supply means and for admitting low pressure fluid from said low pressure supply means to said chamber including a single passage communicating with said chamber and said low pressure supply means, a pair of main valve members cooperating with valve seats in said passage, a pilot valve associated with one of said main valve members, and common means for opening both of said main valve members when low pressure fluid is to be admitted to said chamber and for first opening said pilot valve and cracking the other main valve member and thereafter opening both of said main valve members wide when high pressure fluid is to be exhausted from said chamber, said last named means including a single actuator provided with cam projections and plungers associated with said cam projections and said valve members for operating the latter from said cam projections, said actuator also including other cam projections and plungers associated therewith and with said high pressure valve and said low pressure exhaust valve for operating the latter only when the first named valve members are closed, said last named cams being so arranged that only said high pressure valve or said low pressure exhaust valve is open at any one time depending upon the direction of movement of said actuator, and means associated with said actuator for preventing movement thereof to the position for opening said high pressure valve until said first named valve members have been opened to establish a predetermined pressure in said chamber.

20. In a valve mechanism for controlling the flow of high and low pressure fluid in succession, a body having a high pressure valve with an inlet adapted to be connected to a source of high pressure fluid and an outlet communicating with a chamber in said body, said chamber being adapted to communicate with a means to or from which said fluid may flow, a low pressure exhaust valve having its inlet in communication with said chamber and its outlet adapted to communicate with exhaust means, and means for exhausting high pressure fluid from said chamber to a low pressure supply means and for admitting low pressure fluid from said low pressure supply means to said chamber including a single passage communicating with said chamber and said low pressure supply means, a pair of main valve members cooperating with valve seats in said passage, a pilot valve associated with one of said main valve members, common means for opening both of said main valve members when low pressure fluid is to be admitted to said chamber and for first opening said pivot valve and cracking the other main valve member and thereafter opening both of said main valve members wide when high pressure fluid is to be exhausted from said chamber, said last named means including a single actuator provided with cam projections and plungers associated with said cam projections and said valve members for operating the latter from said cam projections, said actuator also including other cam projections and plungers associated therewith and with said high pressure valve and said low pressure exhaust valve for operating the latter only when the first named valve members are closed, said last named cams being so arranged that only said high pressure valve or said low pressure exhaust valve is open at any one time depending upon the direction of movement of said actuator, and means associated with said actuator for preventing movement thereof to the position for opening said high pressure valve until said first named valve members have been opened to establish a predetermined pressure in said chamber, and said low pressure exhaust valve also being provided with a pilot valve which is opened by its associated plunger before said exhaust valve is opened by said plunger.

HENRY Z. GORA.